(12) United States Patent
Olfat

(10) Patent No.: US 8,175,032 B2
(45) Date of Patent: May 8, 2012

(54) SYSTEM AND METHOD FOR RADIO FREQUENCY RESOURCE ALLOCATION

(75) Inventor: Masoud Olfat, Clarksville, MD (US)

(73) Assignee: Clearwire IP Holdings LLC, Bellevue, WA (US)

( * ) Notice: Subject to any disclaimer, the term of this patent is extended or adjusted under 35 U.S.C. 154(b) by 682 days.

(21) Appl. No.: 11/517,365

(22) Filed: Sep. 8, 2006

(65) Prior Publication Data

US 2008/0062914 A1    Mar. 13, 2008

(51) Int. Cl.
*H04W 4/00* (2009.01)
*H04W 72/00* (2009.01)
*H04L 27/00* (2006.01)

(52) U.S. Cl. ........ 370/328; 370/329; 370/330; 370/332; 370/333; 455/450; 455/451; 455/452.1; 455/452.2; 375/259; 375/260

(58) Field of Classification Search .......... 370/328–330, 370/332, 333; 455/452.1, 450, 451, 452.2, 455/464, 509; 375/259–267
See application file for complete search history.

(56) References Cited

U.S. PATENT DOCUMENTS

| 6,853,629 | B2 * | 2/2005 | Alamouti et al. | 370/330 |
|---|---|---|---|---|
| 7,020,106 | B2 * | 3/2006 | Barnard et al. | 370/329 |
| 7,346,021 | B2 * | 3/2008 | Yoshizawa et al. | 370/322 |
| 2003/0165123 | A1 * | 9/2003 | Saunders et al. | 370/329 |
| 2004/0204101 | A1 * | 10/2004 | Qiu et al. | 455/561 |
| 2005/0032534 | A1 * | 2/2005 | Yoshizawa et al. | 455/507 |
| 2005/0286408 | A1 * | 12/2005 | Jin et al. | 370/208 |
| 2006/0120321 | A1 | 6/2006 | Gerkis et al. | |
| 2006/0126558 | A1 * | 6/2006 | Lee et al. | 370/329 |
| 2006/0140115 | A1 * | 6/2006 | Timus et al. | 370/230 |

OTHER PUBLICATIONS

International Search Report and Written Opinion for PCT/US07/19375 dated Feb. 13, 2008.
WiMAX Forum, "Mobile WiMAX—Part I: A Technical Overview and Performance Evaluation", Jun. 2006, pp. 1-53.

* cited by examiner

*Primary Examiner* — Un C Cho
*Assistant Examiner* — Jing Gao
(74) *Attorney, Agent, or Firm* — Crowell & Moring LLP

(57) ABSTRACT

Systems and methods for allocating radio frequency resources are provided. The radio frequency resources are allocated to a mobile station in time or frequency alignment based on signal quality measures. In an orthogonal frequency division multiple access system, the allocated radio frequency resources include one or more tones and one or more symbols.

13 Claims, 5 Drawing Sheets

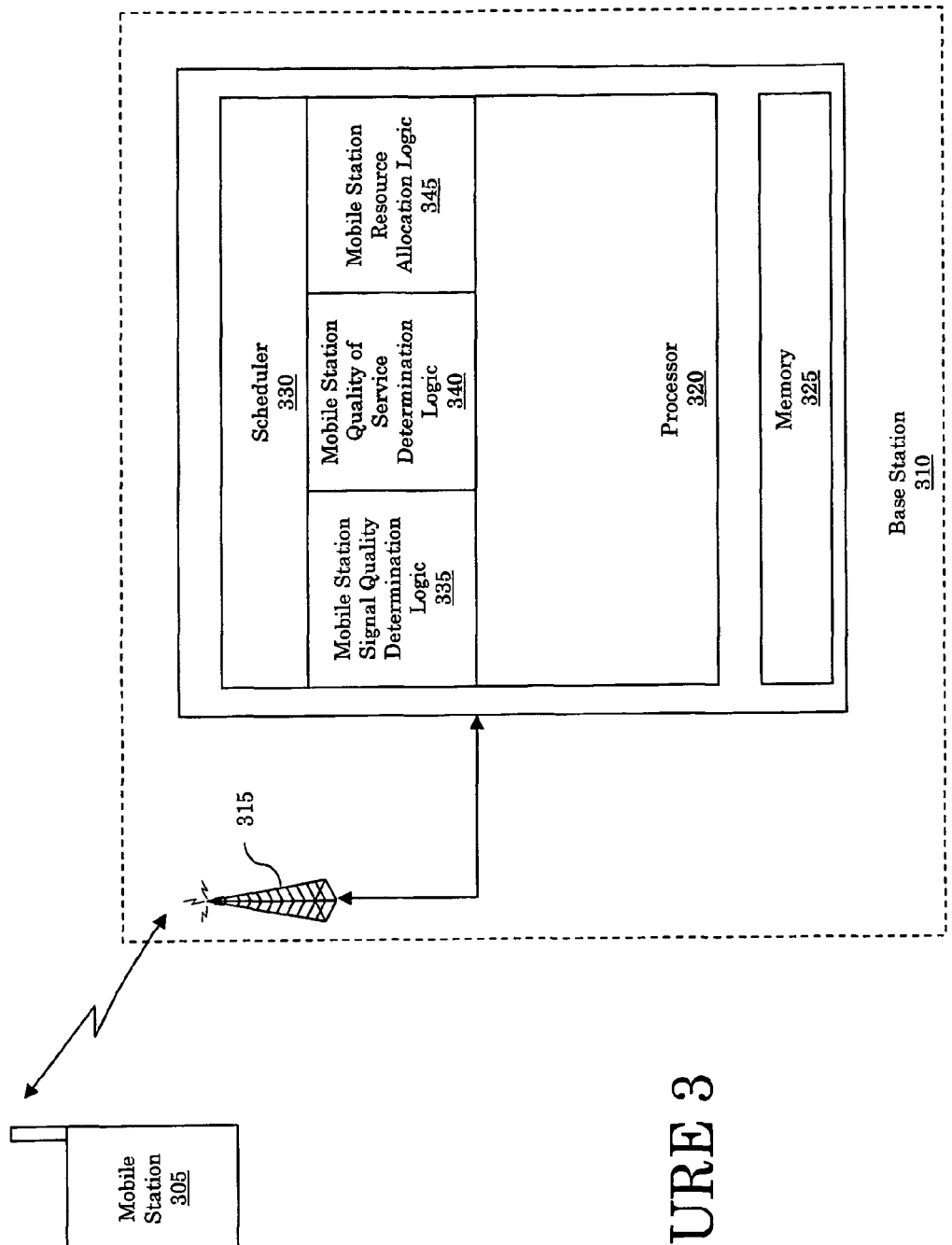

SYSTEM AND METHOD FOR RADIO FREQUENCY RESOURCE ALLOCATION

BACKGROUND OF THE INVENTION

For many years wireless communication technologies have focused on providing high quality voice services to mobile stations. Recently there has been a desire to provide broadband wireless data to satisfy increasing demands for multimedia applications. Broadband wireless data consumes a large amount of radio frequency resources. Radio frequency resources are typically controlled by governmental bodies who allocate radio frequency spectrum to various wireless communication system operators and define the amount of acceptable interference to other radio frequency spectrums. Typically, a wireless communication system operator is allocated only a limited amount of radio frequency spectrum in a particular geographic area. Accordingly, this limited spectrum should be used in an efficient manner to provide wireless broadband data to as many mobile stations as possible.

In wireless communication systems radio frequency resources are allocated to different mobile stations using a scheduler. Conventional scheduling algorithms typically support Quality of Service (QoS) and attempt to maintain high throughput. In wireless communication systems these schedulers account for the location-dependent and time-varying link capacity, limited spectrum, high error-rate and user mobility. Schedulers typically take advantage of the time variation of the wireless channel when allocating resources to avoid allocating resources to a mobile station in a deep fade that causes significant packet loss, while depriving mobile stations with good channel conditions from taking advantage of the instantaneous large capacity. Therefore, conventional schedulers try to balance QoS (including differentiation between mobile stations and guaranteed QoS for particular mobile stations) and providing high network utilization.

FIG. 1 illustrates an exemplary OFDMA frame used for WiMAX communications. An OFDMA subframe includes a predetermined number of tones (which represent frequencies), and each of these tones can be reused over a predetermined number of symbols (each symbol representing a period of time). WiMAX provides 47 symbols per frame, and a varying number of tones dependent upon the total bandwidth allocated to a base station.

The downlink (DL) and uplink (UL) subframes are composed of several slots for user data. Each slot is defined by a rectangular region that comprises one or more symbols (a maximum of three in WiMAX), and a group of tones (adjacent or non-adjacent) in each symbol. Accordingly, the amount of radio frequency resources employed for transmitting information in an OFDMA system is based on the number of allocated tones and symbols. The size of these slots is fixed and known both at the transmitter and receiver. Whether a particular mobile station is scheduled in a particular frame, the size of allocated resource per frame, and the location of the allocated slot within the subframe is identified by the scheduler. The QoS parameters defined for each mobile station (or for each service flow for a mobile station), including maximum sustained data rate, maximum latency and jitter tolerated are used at the scheduler to allocate the slots.

Existing schedulers attempt to balance QoS (differentiation and guarantees) and providing high network utilization. The throughput achieved by mobile station, the packet delay, and other QoS parameters is determined based on whether the mobile station has been scheduled in a particular frame, and how many slots have been allocated to mobile station.

SUMMARY OF THE INVENTION

One factor not considered by conventional schedulers is the location of the allocated slots within the frame, as this has no impact on throughput. However, it has been recognized that the format of the allocated slot can impact the used signal bandwidth (where the used signal bandwidth is defined as the number of tones or frequencies employed at each OFDMA symbol). Specifically, it has been recognized that if the allocated slots are more aligned in frequency, the used bandwidth is increased, and therefore a lower mobile link budget is achieved. Similarly, it has been recognized that if the allocated slots are more aligned in time, the used bandwidth is decreased, and this results in higher link budget.

Exemplary embodiments of the present invention provide systems and methods for radio frequency resource allocation. In accordance with exemplary embodiments of the present invention, a signal quality measure is determined for each mobile station that is to be allocated radio frequency resources. The radio frequency resources are then allocated to each mobile station in frequency or time alignment based on the determined signal quality measures.

Other objects, advantages and novel features of the present invention will become apparent from the following detailed description of the invention when considered in conjunction with the accompanying drawings.

BRIEF DESCRIPTION OF THE DRAWING FIGURES

FIG. 3 illustrates an exemplary system in accordance with the present invention;

DETAILED DESCRIPTION OF THE PREFERRED EMBODIMENTS

The received signal strength at a wireless receiver is dependent on the link budget. The coverage of a broadband wireless technology is defined by its link budget calculated for a particular average data rate at the cell edge. The link budget is defined as the following formula:

$$\text{Link Budget [dB]} = \text{EIRP} - \text{Receiver Sensitivities} + \text{other gains} - \text{other losses} \quad (1)$$

The Effective Isotropically Radiated Power (EIRP), depends on the average transmission power and transmitted impacts, including transmitter antenna gain, filter and cable loss, etc. Receiver Sensitivity is the impact of receiver parameters on the overall link budget. This includes the filter and cable losses, receiver antenna impact, noise figure, thermal noise density, the noise bandwidth, and the required signal to interference-plus-noise ratio (SINR) to achieve a particular cell edge user data rate. Other gains include handoff gain, as well as HARQ, and coding gain, or any other gain resulted from enhancement techniques. Other losses mainly include interference margin, fade and shadowing margin, and penetration losses.

Exemplary embodiments of the present invention focus on the receiver sensitivity, and particularly the noise bandwidth component. The link budget decreases linearly by increasing the bandwidth used (i.e., the number of tones) for data transmission and reception. If the used bandwidth is doubled, the link budget is decreased by 3 dB.

Figure 1:
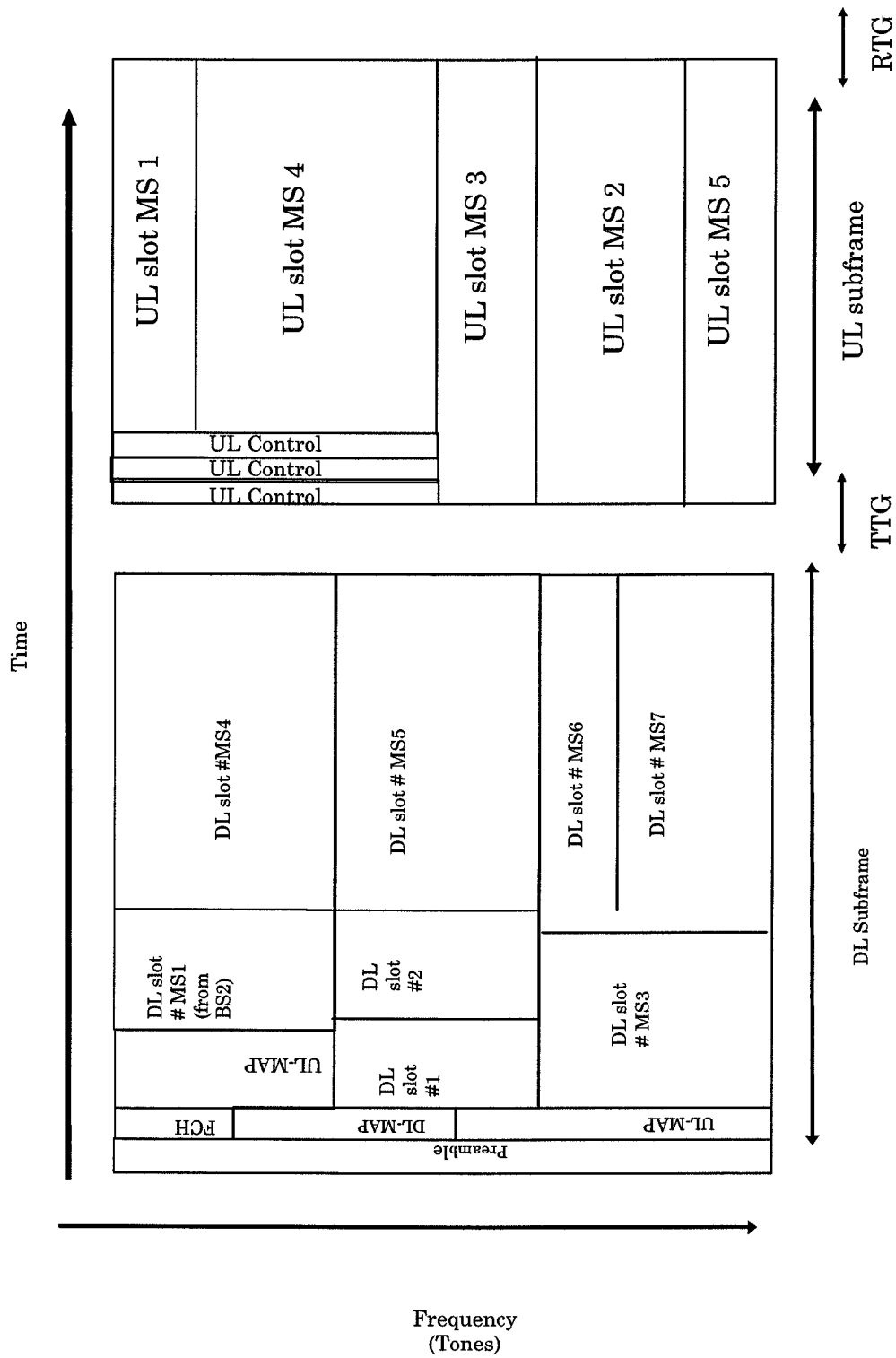
FIG. 1 illustrates an exemplary OFDMA frame.
Figure 2B:
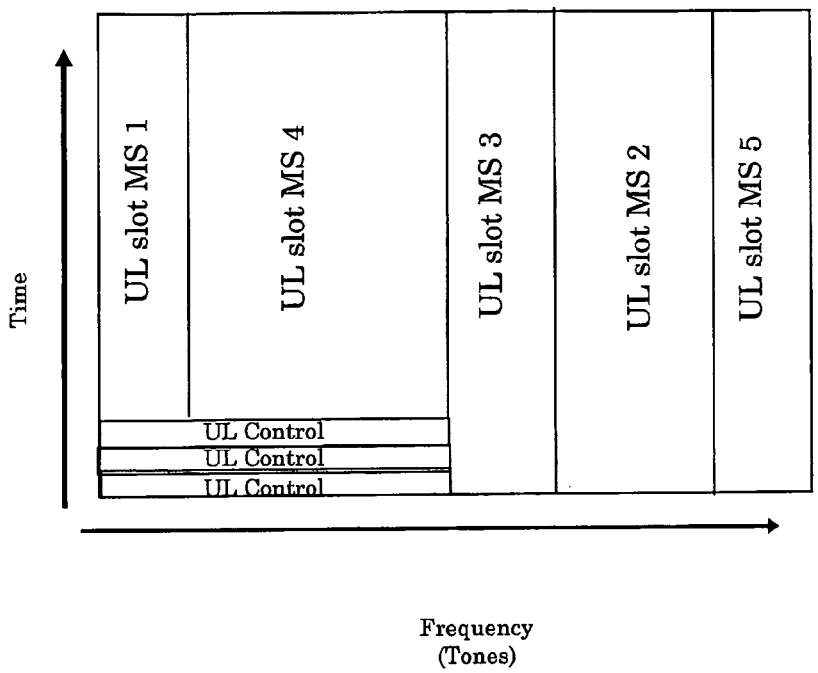
FIGS. 2a and 2b illustrate exemplary OFDMA uplink subframes in accordance with the present invention.
Figure 2A:
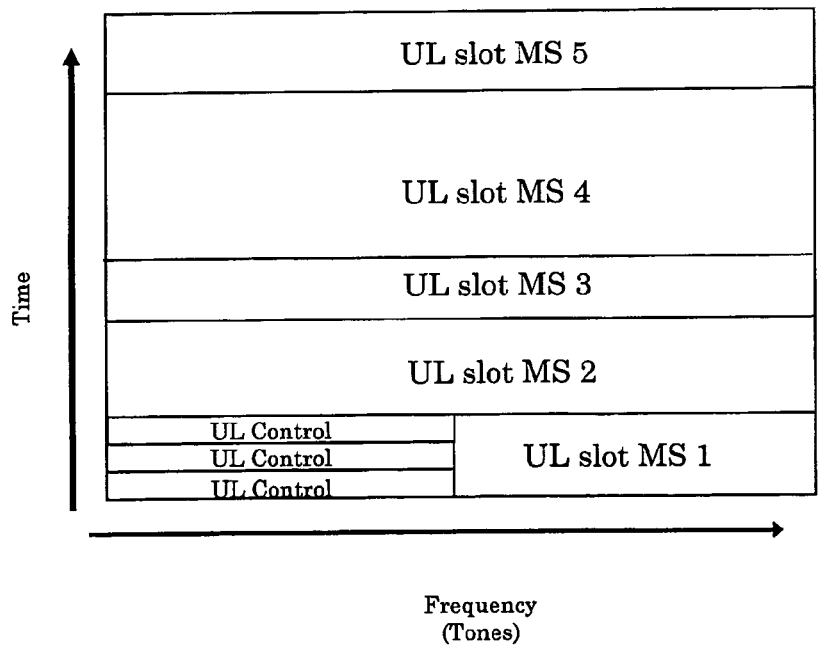

FIGS. 2a and 2b illustrate exemplary OFDMA uplink subframes in accordance with the present invention. Specifically, FIG. 2a illustrates an exemplary uplink subframe with frequency aligned slots (i.e., time multiplexed flows or users) and FIG. 2b illustrates an exemplary uplink subframe with time aligned slots (i.e., frequency multiplexed flows or users). In both cases, the amount of allocated resources, and consequently the achieved throughput and other QoS parameters are the same. However, in the subframe illustrated in FIG. 2a the frequency aligned slots use more signal bandwidth than that of the subframe illustrated in FIG. 2b, where the slots are mainly time aligned. Consequently, the system gain for FIG. 2b is more than that of FIG. 2a.

FIG. 3 illustrates an exemplary system in accordance with the present invention. The system includes at least one mobile station 305 and a base station 310. It will be recognized that base station 310 can support more than one mobile station and that the wireless communication system can include more than one base station. Base station 310 includes base station antenna 315, processor 320 and memory 325. Processor 320 can be a microprocessor, field programmable gate array (FPGA), application specific integrated circuit (ASIC) and/or the like. Memory 325 can be any type of volatile and/or non-volatile memory.

Processor 320 includes scheduler 330, mobile station signal quality determination logic 335, mobile station quality of service determination logic 340, and mobile station resource allocation logic 345, all of which will be described in more detail below in connection with FIG. 4. When processor 320 is a microprocessor, scheduler 330 and logic 335-345 can be processor executable code loaded from memory 325.

Figure 4:
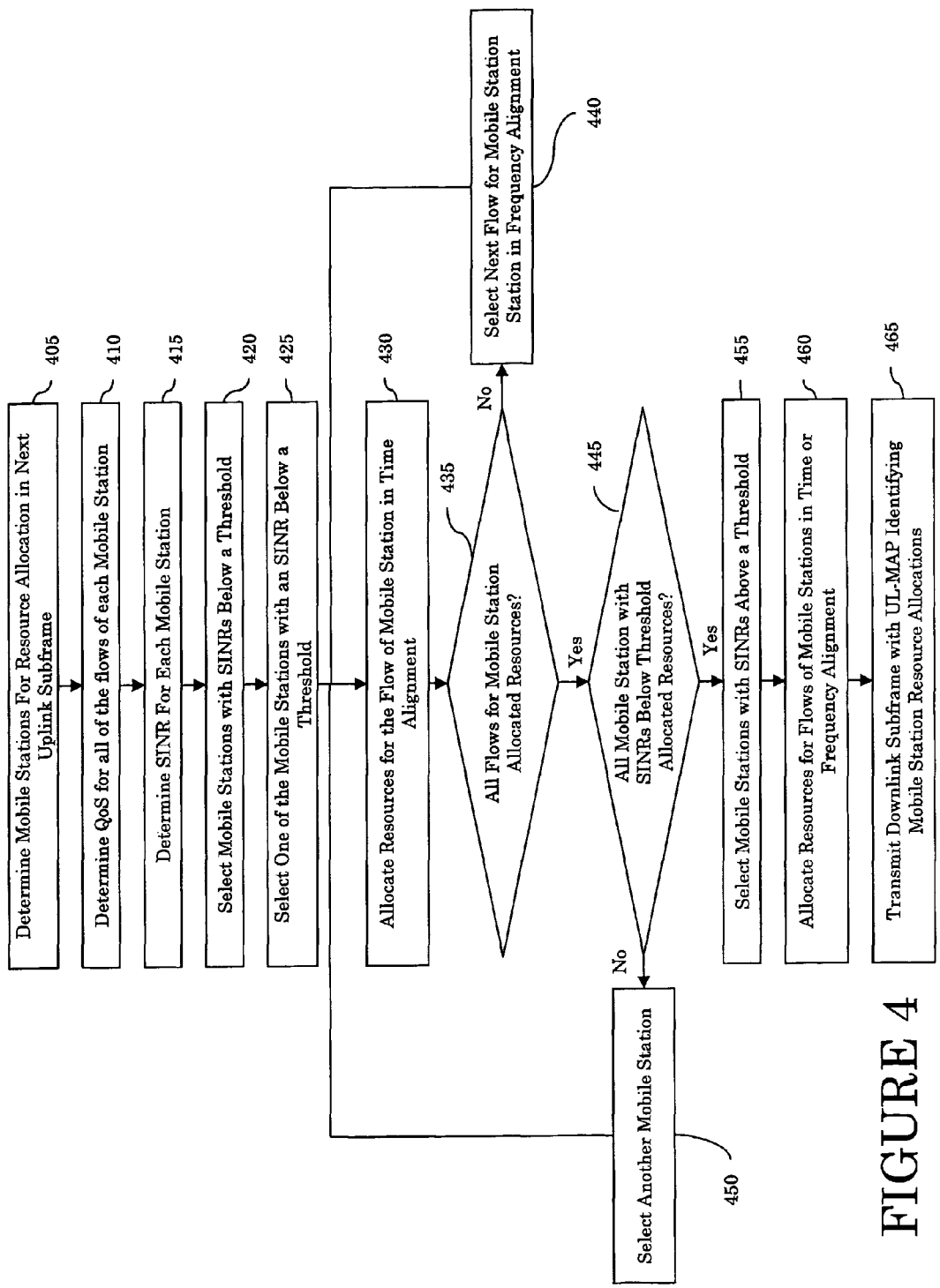
FIG. 4 illustrates an exemplary method for radio frequency resource allocation in accordance with the present invention.

FIG. 4 illustrates an exemplary method for radio frequency resource allocation in accordance with the present invention. Initially, scheduler 330 determines mobile stations and the service flows of those mobiles that are to be allocated resources in the next uplink subframe (step 405). Logic 340 determines the QoS for all of the flows for each mobile station (step 410) and logic 335 determines the SINR for each mobile station (step 415). SINR can be determined in any conventional manner, including being based on mobile station or base station measurements.

Scheduler 330 then selects mobile stations with SINRs below a threshold value (step 420), and then selects one of these mobile stations (step 425). The threshold can be fixed or dynamic. A dynamic threshold can vary based upon, for example, loading of a particular base station. Logic 345 allocates resources for one of the flows for the selected mobile station in time alignment (step 430), and then determines whether all of the flows for the selected mobile station have been allocated resources (step 435). When not all of the flows for the selected mobile station have been allocated resources ("No" path out of decision step 435), then the next flow for the mobile station is selected and allocated resources (steps 440 and 430-440). When all of the flows for a particular mobile station with an SINR below the threshold have been allocated resources ("Yes" path out of decision step 435), then logic 345 determines whether all mobile stations with SINRs below the threshold have been allocated resources (step 445). When not all mobile stations with SINRs below the threshold have been allocated resources ("No" path out of decision step 445), then logic 345 selects another mobile station with an SINR below the threshold and allocates resources for each flow for the mobile station (steps 450 and 430-440).

When all of the mobile stations with SINRs below the threshold have been allocated resources for each of their flows ("Yes" path out of decision step 445), then logic 345 selects the remaining mobile stations and allocates resources, if available, for each of the flows of the remaining mobile stations in time or frequency alignment (steps 455 and 460). When all of the mobile stations have been allocated resources or when all of the resources in the UL subframe have been allocated, then base station 310 transmits a downlink subframe with the UL-MAP identifying mobile station resource allocations (step 465). The mobile stations can then transmit in the uplink subframe using the allocated resources.

Figure 5:
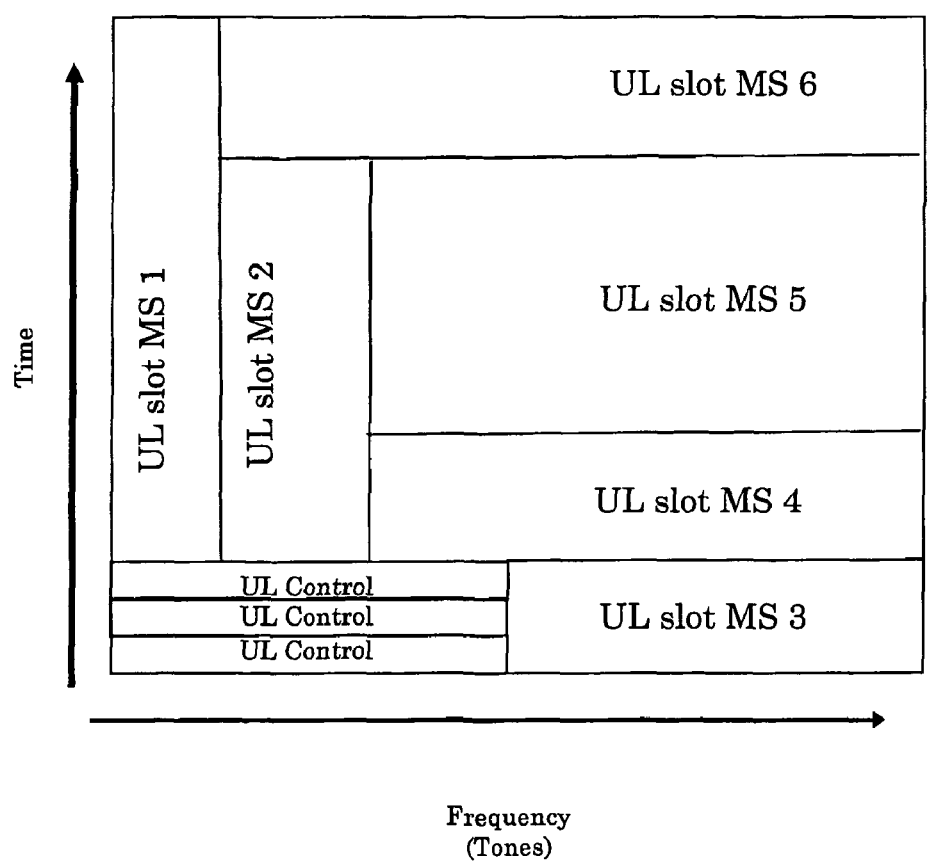
FIG. 5 illustrates an exemplary uplink subframe formed in accordance with the present invention.

FIG. 5 illustrates an exemplary uplink subframe formed in accordance with the present invention. As illustrated in FIG. 5, uplink slots for mobile stations 1 and 2 are time aligned while the uplink slots for mobile stations 3-6 are frequency aligned. In accordance with exemplary embodiments of the present invention these slots can be scheduled in a coverage-aware scheduling fashion. For example, when a mobile station is close to a cell edge, and therefore has a low SINR, the base station tries to schedule mobile station in time alignment. In the subframe of FIG. 5, mobile stations 1 and 2 are close to the cell edge and are allocated more OFDMA symbols but less number of tones in frequency domain, whereas mobile stations 3-6 have better link quality, or are closer to the base station and are allocated more tones but less OFDMA symbols than mobile stations 1 and 2. With the frame of FIG. 5 the occupied signal bandwidth and receive sensitivity for mobile stations 1 and 2 decreases, which results in a higher system gain for these mobile stations, and therefore higher link budget. The only disadvantage of this approach is that, the mobile station would loose the frequency diversity obtained by using a larger signal bandwidth. However, the impact of noise bandwidth on the system gain is more significant than the gap in frequency diversity.

The increased system gain could be exploited in a number of different ways. If it is desired to achieve a fixed data rate at the cell edge, the required SINR stays the same, but the same data rate can be achieved in a higher cell area, with a lower outage rate. Since most broadband wireless technologies are mainly uplink coverage limited, the direct impact is an enhancement of base station coverage. If the cell size is fixed, the same system gain can be achieved with a higher required SINR, and therefore either higher modulation and coding rate can be exploited at the cell edge, or due to improvement in the link quality the percentage of the time HARQ is triggered decreases. The impact of both scenario is the increased data rate at the cell edge.

Although exemplary embodiments have been described in connection with scheduling of uplink resources, the present invention is equally applicable to scheduling of downlink resources. Although exemplary embodiments have been described in connection with WiMAX technology, the present invention is equally applicable to any other type of OFDMA technology, including TDD or FDD, such as F-OFDM, 3G LTE, and IEEE802.20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for radio frequency resource allocation, the method comprising the acts of:
   determining that radio frequency resources are to be allocated to a plurality of mobile stations in an uplink subframe;
   determining a signal quality measure for each mobile station of the plurality of mobile stations; and
   allocating the radio frequency resources in a time alignment within the uplink subframe for mobile stations of the plurality of mobile stations with a determined signal quality measure below a predetermined threshold and then allocating the radio frequency resources within the uplink subframe for mobile stations of the plurality of mobile stations with a determined signal quality measure above the predetermined threshold, wherein at least a first one of the mobile stations with a determined signal quality measure above the predetermined threshold is allocated the radio frequency resources in time alignment in the uplink subframe and at least a second one of the mobile stations with a determined signal quality measure above the predetermined threshold is allocated the radio frequency resources in frequency alignment in the uplink subframe,
   wherein the radio frequency resources includes a number of frequencies and symbols of the subframe, wherein the plurality of mobile stations communicate with a wireless communication system using orthogonal frequency division multiple access (OFDMA),
   wherein the mobile stations allocated radio frequency resources in time alignment are allocated more OFDM symbols but less frequencies than the mobile stations allocated radio frequency resources in frequency alignment.

2. The method of claim 1, wherein the radio frequency resource allocation is also based on a quality of service for the plurality of mobile stations.

3. The method of claim 1, further comprising the acts of:
   informing the plurality of mobile stations of the radio frequency resource allocation.

4. The method of claim 1, wherein the signal quality measure is a signal-to-interference-plus noise ratio (SINR).

5. A method for radio frequency resource allocation, the method comprising the acts of:
   determining that a radio frequency resource is to be allocated to a mobile station;
   determining a signal quality measure for the mobile station; and
   allocating the radio frequency resource to the mobile station in a time or frequency alignment within an uplink subframe based on the signal quality measure, wherein the radio frequency resource is allocated in a time alignment when the signal quality measure is below a predetermined threshold and the radio frequency resource is allocated in frequency alignment when the signal quality measure is above the predetermined threshold, and wherein the mobile station communicates with a base station using orthogonal frequency division multiple access (OFDMA),
   wherein allocation of radio frequency resource in time alignment involves allocating more OFDM symbols but less frequencies than allocation of radio frequency resource in frequency alignment,
   wherein radio frequency resources are first allocated to mobile stations with signal quality measures below the predetermined threshold, and then allocated to mobile stations with signal quality measures above the predetermined threshold.

6. The method of claim 5 wherein the predetermined threshold is fixed.

7. The method of claim 5, wherein the predetermined threshold is dynamic.

8. A base station, comprising:
   a memory; and
   a processor, coupled to the memory, the processor including
      a scheduler,
      logic for determining a signal quality measure for each of a plurality of mobile stations, and
      logic for allocating radio frequency resources in a time alignment within an uplink subframe for mobile stations of the plurality of mobile stations with a determined signal quality measure below a predetermined threshold and then allocating the radio frequency resources within the uplink subframe for mobile stations of the plurality of mobile stations with a determined signal quality measure above the predetermined threshold, wherein at least a first one of the mobile stations with a determined signal quality measure above the predetermined threshold is allocated the radio frequency resources in time alignment in the uplink subframe and at least a second one of the mobile stations with a determined signal quality measure above the predetermined threshold is allocated the radio frequency resources in frequency alignment in the uplink subframe, wherein the radio frequency resource includes a number of frequencies and symbols of the subframe, wherein the plurality of mobile stations communicate with a wireless communication system using orthogonal frequency division multiple access (OFDMA), wherein the mobile stations allocated radio frequency resources in time alignment are allocated more OFDM symbols but less frequencies than the mobile stations allocated radio frequency resources in frequency alignment.

9. The base station of claim 8, wherein the radio frequency resource allocation is also based on a quality of service for the plurality of mobile stations.

10. The base station of claim 8, wherein the signal quality measure is a signal-to-interference-plus noise ratio (SINR).

11. The base station of claim 8, wherein the predetermined threshold is fixed.

12. The base station of claim 8, wherein the predetermined threshold is dynamic.

13. The method of claim 5, wherein the radio frequency resource is allocated to a first plurality of mobile stations in the uplink subframe in time alignment and to a second plurality of mobile stations in the uplink subframe in frequency alignment.

* * * * *